United States Patent [19]

Repiquet et al.

[11] 3,865,762
[45] Feb. 11, 1975

[54] FLEXIBLE POLYURETHANE FOAMS PREPARED BY THE USING A MIXTURE OF POLYETHER-POLYOLS AND MIXTURE OF POLYISOCYANATES

[75] Inventors: Gerard Repiquet, Martigues; Jean Claude Crouzet, Avignon, both of France

[73] Assignee: Naphtachimie, Paris, France

[22] Filed: Oct. 29, 1973

[21] Appl. No.: 410,689

Related U.S. Application Data

[63] Continuation of Ser. No. 139,226, April 30, 1971, abandoned.

[30] Foreign Application Priority Data
Apr. 15, 1970 France .............................. 70.13615

[52] U.S. Cl... 260/2.5 AP, 260/2.5 AT, 260/2.5 AZ
[51] Int. Cl. ............................................. C08g 22/46
[58] Field of Search..... 260/2.5 AP, 2.5 AT, 2.5 AZ

[56] References Cited
UNITED STATES PATENTS

| | | | |
|---|---|---|---|
| 3,336,242 | 8/1967 | Hampson et al. | 260/2.5 |
| 3,380,967 | 4/1968 | Lowe et al. | 260/2.5 |
| 3,425,999 | 2/1969 | Axelrood et al. | 260/2.5 |
| 3,461,086 | 8/1969 | Mogford et al. | 260/2.5 |
| 3,476,933 | 11/1969 | Mendelsohn | 260/2.5 |
| 3,546,145 | 12/1970 | Granger et al. | 260/2.5 |
| 3,595,814 | 7/1971 | Lloyd et al. | 260/2.5 |

FOREIGN PATENTS OR APPLICATIONS

| | | | |
|---|---|---|---|
| 1,160,041 | 7/1969 | Great Britain | 260/2.5 |

Primary Examiner—Eugene C. Rzucidlo

[57] ABSTRACT

This invention is addressed to the manufacture of flexible polyurethane foams at ambient temperatures in which the reaction mixture comprises at least one polyether-polyol having an equivalent molecular weight within the range of 1000–2000 and an average functionality within the range of 2.5 to 6, a polyether-polyol having an equivalent molecular weight within the range of 75–1000 and having an average functionality of 2 to 3, at least one polyisocyanate having 2–4 benzene nuclei, at least one isocyanate grouping and at least one tolylene di-isocyanate.

15 Claims, No Drawings

FLEXIBLE POLYURETHANE FOAMS PREPARED BY THE USING A MIXTURE OF POLYETHER-POLYOLS AND MIXTURES OF POLYISOCYANATES

This is a continuation, of application Ser. No. 139,226, filed Apr. 30, 1971 now abandoned.

The present invention relates to the manufacture of flexible polyurethane foams and particularly a process for the preparation of polyurethane foams which enables shaping and cross-linking of the foam in the region of the ambient temperature. The invention also relates to compounds of polyethers-polyols and compounds of organic polyisocyanates which are suitable for use in the process.

It is known to manufacture flexible polyurethane foams from a polyether-polyol whose functionality is at least equal to three, and from organic polyisocyanates currently used in the manufacture of polyurethanes, such as tolylene di-isocyanate, generally called TDI. However, in order completely to cross-link these foams, it is necessary to subject them to a thermal treatment or thermal curing before removing them from the mold. The necessity of curing, in industrial practice, give rise to numerous disadvantages, since it is necessary to have available ovens of a considerable volume. Moreover, the time during which the molds are used is prolonged due to the time required for the thermal curing.

It order to avoid this thermal curing, it has been suggested to manufacture polyurethane foams at ambient temperature, from a polyether-polyol whose molecular weight is at least 3000, and from an organic polyisocyanate with both reactants being selected from among very reactive compounds. This technique consists essentially in using a polyether-triol which has terminal primary hydroxyl group, i.e., very reactive ones; and in using, an organic polyisocyanate, crude diphenyl methane di-isocyanate, currently known as crude MDI, or polymethylene polyphenylisocyanate, currently known as PAPI. These organic polyisocyanates also are very reactive. Even though they have interesting properties, the foams manufactured by this technique, however, have a comparatively high density at their innermost part, generally a density greater than 50 g/l. It is possible to reduce this density by increasing the proportion of the expansion agent used; however, the foams thus obtained do not have a fine and regular skin, and, due to this fact, the lack flexibility to the touch. Moreover, their mechanical characteristics, notably their resistance to breaking, and their stretching when subjected to breaking strain, then become completely insufficient.

It has also been attempted to manufacture foams without thermal curing, in accordance with the technique explained hereinabove, but using, as organic polyisocyanate, mixtures which contain TDI. However, this modified technique does not lead to good results, especially with regard to the surface appearance of the foams when it is sought to lower their density by increasing the proportion of the expansion agent.

It is accordingly an object of the present invention to produce and to provide a method for the preparation of foamed polyurethanes having a relatively low interior density, generally less than 50 g/l. and having satisfactory appearance and excellent physical properties in which the foamed polyurethanes are prepared at ambient temperatures without the necessity of thermal curing.

It is another object of the present invention to provide polyether-polyol compositions suitable for use in the preparation of foamed polyurethanes at ambient temperatures.

The concepts of the present invention reside in a process for the manufacture of flexible polyurethane foams, which consists of casting a foaming mixture into a mold in which it is cross-linked. After cross-linking, the foam thus manufactured is removed from the mold. All of these operations are carried out in the region of the ambient temperature, using a foaming mixture which consists essentially of (a) a polyether-polyol or a mixture of polyether-polyols having an equivalent molecular weight between 1000 and 2000, and preferably in the region of 1600, and having average functionality or hydroxyl index between 2.5 and 6. This polyether-polyol is preferably prepared by polycondensation, on a polyol, first with an alkylene oxide containing at least 3 carbon atoms and then ethylene oxide with 10 to 30% by weight, and preferably 15 to 20% by weight, of the fixed oxides, being ethylene oxide; (b) 2 to 30% by weight, and preferably 5 to 20% by weight, based on the weight of the preceding polyether-polyol(a), of a polyether-polyol having an equivalent molecular weight between 75 and 1000, and preferably between 150 and 750, and having an average functionality from 2 to 3. This polyether-polyol is prepared by polycondensation, on water, on a lower alkylene glycol, or on an alkane triol, of one or more lower alkylene oxides in which at least 15% by weight of the alkylene oxides is ethylene oxide; (c) Crude organic polyisocyanates such as crude MDI and/or PAPI, or likewise crude TDI. These polyisocyanates preferably contain 2 to 4 benzene nuclei, joined to each other and contain at least one isocyanate grouping; (d) 10 to 80% by weight, and preferably 30 to 60% by weight, based on the weight of the preceding polyisocyanates(c), of 2–4 and 2–6 isomers of tolylene di-isocyanate. In general, the ratio of the totality of the NCO groupings of the organic polyisocyanates (c + a) to the entirety of the hydroxyl functions of the polyethers-polyols(a + b) is within the range of 0.6 to 1.5, and preferably 0.8 to 1.3.

The polyether-polyol, or the mixture of polyethers-polyols, of an equivalent molecular weight between 1000 and 2000, may be prepared by condensation of a polyol, or on a mixture of polyols, (e.g., an alkane triol such as glycerol, lower alkylene glycols such as ethylene glycol, propylene glycol, diethylene glycol, etc.); first propylene oxide, butylene oxide and/or tetrahydrofuran and then ethylene oxide. Propylene oxide is preferably used in the first condensation stage.

The polyether-polyol of an equivalent molecular weight between 75 and 1000 may be prepared entirely from ethylene oxide, but it is preferable to manufacture it partially from propylene oxide, butylene oxide, or tetrahydrofuran, in order to improve its compatibility in mixture with the polyether-polyols of an equivalent molecular weight between 1000 and 2000. It has been found that polyethers-polyols prepared from 50 to 80% by weight of ethylene oxide, and from 50 to 20% by weight of propylene oxide, give particularly advantageous results.

In the preceding description, the equivalent molecular weight of the polyethers-polyols is calculated according to the hydroxyl index of these polyethers-polyols. This hydroxyl index is measured in accordance with current analytical methods.

The tolylene di-isocyanate used may be constituted by current mixtures of the two 2-4 and 2-6 isomers, in proportions which may vary between 80% of 2-4 isomers, 20% of 2-6 isomers; and 65% of 2-4 isomers, 35% of 2-6 isomers.

The foaming mixture is completed by various additives such as an expansion or blowing agent, which generally is water, in proportions of 1 to 5% by weight in relation to the entirety of the polyethers-polyols. It is also possible to add a volatile organic expansion agent such as monofluorotrichloromethane, or methylene chloride, in proportions which may amount to as much as 25% by weight, in relation to the entirety of the polyethers-polyols. Such volatile organic expansion agents have the advantage of increasing the flexibility of the foam, which may be desirable in certain cases.

The foaming mixture also contains, as catalyst, amines such as, for example, triethylene diamine, triethylamine, dimethylcyclohexylamine, or mixtures of these amines. It is preferable to avoid the use of metallic catalysts such as octoate of tin or dibutyldilaurate of tin, since the tolerance of the foaming mixtures in accordance with the invention, to the concentration variations of these metallic catalyst, is weak.

It is also preferable not to use any tensio-active or surface active agents such as silicon oils, in order to obtain foams with a cellular structure which leads to optimum physical properties. However, it is possible to use, in very small quantities, (less than 0.5% by weight in relation to the entirety of the polyethers-polyols) tensio-active fluids such as the fluid "D 193" of Dow Corning, used for the preparation of rigid polyurethane foams, or the fluid "DC 1310" of Dow Corning, used in the manufacture of flexible polyurethane foams from polyesters.

The foaming mixtures in accordance with the invention may be easily worked, by simple mixing of their constituents. However, it is more convenient to prepare a mixture which is stable in storage, from all the constituents except the organic polyisocyanates. At the time of use, the organic polyisocyanates are added to this mixture, with vigorous agitation, at a temperature in the region of that of the place of work, and preferably lower than 25°C., since, above that temperature, the creaming time of the foaming mixture may be too short to permit the obtaining of a homogeneous mixture.

The foaming mixture thus prepared is case in a mold which is at ambient temperature or is slightly preheated to a temperature of the order of 35° to 40°C., which facilitates the removal of the foam from the mold, and causes the formation of a fine skin.

The molds which are used may be of a metallic nature, or may be constructed of plastics material such as polyesters. They are preferably entirely closed, without any vent aperture and consequently should be constructed in such a manner as to be able to withstand a slight excess pressure. In effect, for the manufacture of molded items of complex shape, it is preferably to introduce into the mold a quantity of foaming mixture greater by about 10 to 30% than that which would be exactly necessary for entirely filling the mold.

After closure of the mold, the mold is left to rest for a few minutes, to allow the foaming mixture to expand, and then to become cross-linked. Then the mold is opened, and the item is taken out of the mold. It order to facilitate removal from the mold, it is advisable to coat the mold, before the casting of the foaming mixture, with one of the conventional mold stripping agents currently used in the manufacture of polyurethane foams.

This technique of casting in a closed mold may be employed in the manufacture of items which have very different shapes, such as seats, mattresses, cushions, etc. It is particularly applicable for making monobloc seats for the automobile industry, and for furnishings.

The foaming mixtures in accordance with the invention likewise may be cast in open molds, with a technique analogous to that described above. By this means, it is possible to manufacture blocks of foam of great length.

The foams thus manufactured are very pleasing to the appearance and touch; their skin is fine or extremely fine, and is completely free of bubbles. Their density at the innermost part may be very low, notably less than 50 g/l. Although they are very light, these foams are endowed with remarkable physical and mechanical properties. In this way, their stretching when subjected to breaking strain, and their resistance to tearing and breaking, are considerably improved in contrast to known foams manufactured without thermal curing. Moreover, their elastic properties, as will be shown hereinafter, render these foams particularly interesting.

Having described the basic concepts of the invention, reference is now made to the following examples, which are provided by way of illustration, and not of limitation, of the practice of the invention.

EXAMPLES 1 to 4

A polyether triol having a molecular weight of 4800 according to the hydroxyl index is prepared by condensation, on glycerol, first with propylene oxide and then with ethylene oxide. The proportion by weight of ethylene oxide (propylene oxide and ethylene oxide) is 15%.

A polyether glycol having a molecular weight of 800 according to the hydroxyl index is prepared by condensation, on water, of a mixture of 75% by weight of ethylene oxide and of 25% by weight of propylene oxide. Subsequently, 100 parts by weight of polyether-triol are mixed with 10 parts by weight of polyether glycol.

In addition, a mixture of organic polyisocyanates is prepared from 70 parts by weight of crude MDI and 30 parts by weight of TDI 80/20.

Subsequently, a foaming mixture is manufactured, from the mixture of polyethers-polyols, of expansion agents, of catalysts, and finally of the mixture of organic polyisocyanates. The nature of the expansion agents and of the catalysts, and also the quantities of all the ingredients, is specified in Table I hereinafter.

After the mixture of organic polyisocyanates has been incorporated into the foaming mixture, this mixture is agitated for 8 seconds and then poured into a stainless steel mold whose volume is 7.5 liters and whose wall thickness is 2 mm and which had been preheated to 35°C. and coated on the interior with a fine film of "Johnson 103" wax as a mold-stripping agent. The molded item is taken from the mold, after having remained in the mold for a period of 10 minutes at ambient temperature, in the region of 20°C.

Subsequently, the foam is subjected to various tests, whereof the results are stated precisely in Table I hereinafter.

In these tests:

The porosity is measured by the output of dry nitrogen, expressed in liters per minute, traversing a test piece whose square base is equal to 5 cm × 5 cm and whose thickness is 2.5 cm. One of its surfaces, this test piece is subjected to an excess pressure of 1.3 cm of water;

The resistances to stretching and to breakage are measured according to the norm ASTM D 1564-62 T, on a test piece whose dimensions are equal to 12 mm × 12 mm × 35 mm, the unrolling speed being 500 mm per minute;

The rebound is measured in accordance with the norm ASTM D 1564-62 T, by the rebound percentage of a steel ball which falls from a determined height onto a sample of foam;

The lift, before fatigue, is measured by the force in kg applied uniformly upon a sample which has a square base 8 cm × 8 cm and which is in 4 cm thickness, for compressions of 25%, 50% and 65%. It is measured again to 50% of driving-in, after decompression of 65% to 50%.

The lift, after fatigue, also is measured in the same manner, that is to say 24 hours after the sample has undergone a dynamic fatigue consisting of 250,000 cycles of compression between 50% and 90% of the initial thickness of the sample during a period of time lasting 22 hours, at ordinary temperature;

The loss of lift is expressed by the relative difference of the lifts of the sample, measured before and after dynamic fatigue, for a compression of 50%;

The loss of thickness after fatigue is the relative loss of thickness, expressed in %, after dynamic fatigue.

The "C Set," after dynamic fatigue, is the relative loss of thickness, expressed in %, of a test piece made of foam which has been subjected to a compression of 90% between two plates for 22 hours at 70°C. Beforehand, the test piece has been subjected to the dynamic fatigue test.

The hysteresis is the relative difference of the forces, applied to the compression and decompression on the same test piece, for instances of driving-in identical to 50% of the thickness of the sample.

EXAMPLE 5

A polyether-glycol having a molecular weight of 400 according to the hydroxyl index, is prepared by the addition of ethylene oxide to diethylene glycol. Subsequently, a premix is prepared having the following composition:

|  | Parts by Weight |
|---|---|
| Polyether triol of 4800 molecular weight as described in Examples 1 to 4 | 250 |
| Polyether glycol with ethylene oxide of 400 molecular weight | 25 |
| Water | 7.5 |
| 33% solution of triethylene diamine in dipropylene glycol | 2 |
| Dimethylcyclohexylamine | 2.5 |
| Monofluorotrichloromethane | 25 |

Also a mixture of organic polyisocyanates is prepared from 87.5 parts by weight of crude MDI and 37.5 parts by weight of TDI 80/20.

Subsequently a foaming mixture is prepared from the pre-mixture, into which the mixture of polyisocyanates is incorporated. Agitation is carried out for 8 seconds, and the foaming mixture is poured into the metallic mold used in the preceding examples.

After the mold has been left for 10 minutes at the ambient temperature (20°C.), the molded item is removed from the mold, and then it is subjected to the usual tests. The results obtained appear in Table I hereinafter.

EXAMPLE 6

From polyether triol and polyether glycol with 75% of ethylene oxide used in Examples 1 to 4, a premix is prepared having the following composition:

|  | Parts by Weight |
|---|---|
| Polyether triol of 4800 molecular weight | 250 |
| Polyether glycol with 75% of ethylene oxide and of 800 molecular weight | 25 |
| Water | 7.5 |
| 33% solution of triethylene diamine in dipropylene glycol | 2.5 |
| Dimethylcyclohexylamine | 2.5 |
| Monofluorotrichloromethane | 25 |

A mixture of organic polyisocyanates is also prepared from 56.25 parts by weight of crude MDI and 56.25 parts by weight of TDI 80/20.

Subsequently, a foaming mixture is manufactured from the pre-mixture, into which the polyisocyanates mixture is incorporated. Agitation is carried out for 8 seconds, and the foaming mixture is poured into the metallic mold already used in Examples 1 to 4. After remaining in the mold for 10 minutes at ambient temperature (20°C.), the molded object is removed from the mold. It has a pleasing appearance.

Table I

| EXAMPLES | 1 | 2 | 3 | 4 | 5 |
|---|---|---|---|---|---|
| Mixture of polyethers-polyols (g) | 265 | 265 | 265 | 374 | 275 |
| H₂O | 7.5 | 7.5 | 7.5 | 8.5 | 7.5 |
| 33% solution of triethylene diamine in dipropylene glycol (g) | 2.5 | 2.0 | 2.0 | 2.7 | 2.0 |
| Dimethylcyclohexylamine (g) | 2.5 | 2.5 | 2.5 | 2.7 | 2.5 |
| Monofluorotrichloromethane (g) | 25 | 25 | 25 | -0- | 25 |
| Mixture of organic polyisocyanates (g) | 121 | 109 | 133 | 143 | 125 |
| NCO/OH Index (%) | 100 | 90 | 110 | 100 | 96 |
| Appearance - Feel | Pleasing, Soft and Flexible | | | | |
| Skin | Very fine and very regular | | | | |
| Density at the innermost part (g/l) | 31.4 | 32 | 29 | 48 | 33.6 |
| Porosity (l/min.) | 160 | 150 | 90 | 80 | 150 |
| Stretching on breaking strain (%) | 110 | 110 | 106 | 120 | 100 |
| Resistance to breaking (g/cm²) | 900 | 700 | 1020 | 710 | 850 |
| Rebound (%) | 57 | 51 | 60 | 56 | 56 |
| Ratio of lifts for compressions | | | | | |

Table I – Continued

| EXAMPLES | | 1 | 2 | 3 | 4 | 5 |
|---|---|---|---|---|---|---|
| of 65% and of 25% | | 3.3 | 3.2 | 4 | 3 | 3.15 |
| Lift before fatigue | (25% | 0.555 | 0.436 | 0.725 | 1.06 | 0.725 |
| for compressions of | (50% | 1 | 0.75 | 1.44 | 1.75 | 1.2 |
| (kg) | (65% | 1.84 | 1.41 | 3.0 | 3.12 | 2.5 |
| Loss of lift after fatigue (%) | | 7 | 5 | 11 | 7 | 6 |
| Loss of thickness after fatigue (%) | | 2.4 | 2.7 | 4 | 2.5 | 2 |
| "C Set" after dynamic fatigue (%) | | 7 | 10 | 7 | 5 | 4 |
| Hysteresis (%) | | 20 | 20 | 22 | 18 | 0 |

An improvement to the process of the invention has also been discovered, which involves introducing with the other components of the foaming mixture, from 2 to 10% and preferably from 3 to 5% by weight of triethanolamine with respect to the total quantity of the polyether-polyols. Using this improvement, the quantity of organic polyisocyanates is preferably modified in such a manner that the total number of NCO groups of polyisocyanates to the total number of hydroxyl functions of the polyether-polyols and the triethanolamine, ranges from 0.6 to 1.5.

An advantage of the above improvement is to avoid any possible shrinking of the foams being manufactured. The presence of triethanolamine in foaming mixtures for flexible foams generally causes some rigidity in the foams; it has been observed, however, that the above mentioned improvement does not affect sensibly neither the flexibility, the appearance, nor the feel of the foams. It was also observed that the conservation of the mechanical properties of the foams was principally due to the tolylene diisocyanate present in the foaming mixtures.

This concept may be illustrated by the following examples.

EXAMPLES 7 and 8

A foaming composition is prepared from the same components as in Examples 1 to 4, with the exception that some triethanolamine was mixed with the polyether-polyols.

With the quantities of the various components indicated in Table II, a foaming mixture is prepared by mixing, in the head of a continuous molding machine, on the one hand, the mixture of the polyisocyanates, and, on the second hand, the mixture of all the remaining components of the foaming mixture. This mixture is uniformly spread on the conveyor-belt according a side-to-side swinging motion, the speed of the belt being fixed between 4 and 7 meters per minute, according to the flow rate of the foaming mixture. The expansion is completed after 90 seconds. Foam blocks can be handled after some 10 minutes, and stored, the "squeeze" operation usually performed for avoiding retraction being omitted.

The foams obtained are subjected to various tests, the results of which are given in Table II hereafter.

TABLE II

| EXAMPLES | 7 | 8 |
|---|---|---|
| Polyether-triol, PM 4,800(g) | 91 | 91 |
| Polyether-glycol,PM 800(g) | 9 | 9 |
| H₂O(g) | 3 | 3 |
| 33% solution of triethylene diamine in dipropylene glycol(g) | 0.8 | 0.8 |
| Dimethylethanolamine(g) | 0.8 | 0.8 |
| Triethanolamine(g) | 3 | 3 |
| Monofluorotrichloromethane(g) | 10 | 10 |

TABLE II – Continued

| EXAMPLES | | 7 | 8 |
|---|---|---|---|
| Mixture of organic polyisocyanates(g) | | 49 | 60 |
| NCO/OH + H index(%) | | 90 | 110 |
| Appearance - Feel | | Pleasing - soft and flexible | |
| Skin | | Very fine and very regular | |
| Density at the innermost part(g/l) | | 30 | 26 |
| Porosity(l/min) | | 220 | 300 |
| Stretching on breaking strain(%) | | 110 | 100 |
| Resistance to breaking(g/cm²) | | 400 | 500 |
| Rebound(%) | | 46 | 51 |
| Ratio of lifts for compression of 65%(g) | | 3.75 | 4 |
| Lifts before fatigue for | (25% | 0.34 | 0.64 |
| compressions of (kg) | (50% | 0.64 | 1.10 |
| | (65% | 1.28 | 2.60 |

It will be understood that various changes and modifications can be made in the details of procedure, formulation and use without departing from the spirit of the invention, especially as defined in the following claims.

We claim:

1. Flexible polyurethane foams having a density less than 50 g/l prepared by casting in a mold in which the foam is cross-linked at ambient temperature without the necessity of thermal curing a foaming mixture comprising (1) at least one polyether-polyol having an equivalent molecular weight within the range of 1000 to 2000 and an average functionality within the range of 2.5 to 6, prepared by condensing a polyol first with an alkylene oxide containing at least 3 carbon atoms and then with ethylene oxide, with the ethylene oxide constituting from 10 to 30% by weight of the oxides condensed with the polyol; (2) 2 to 30% by weight, based on the weight of (1), of a polyether-polyol having an equivalent molecular weight within the range of 75 to 1000 and an average functionality from 2 to 3, prepared by condensation of ethylene oxide or a mixture of ethylene oxide with at least one other alkylene oxide in which at least 25% by weight of the mixture is ethylene oxide with a material selected from the group consisting of water, a glycol and a triol; (3) at least one organic polyisocyanate containing 2 to 4 benzene nuclei with each nucleus containing at least one isocyanate grouping; (4) 10 to 80% by weight, based on the weight of (3), of a tolylene diisocyanate; and (5) a blowing agent; and removing the molded foam, with the ratio of the total NCO groups of (3) and (4) to the total of the hydroxyl groups of (1) and (2) being within the range of 0.6 to 1.5.

2. A foam as defined in claim 1 wherein the expansion agent is selected from the group consisting of water and a volatile organic compound.

3. A foam as defined in claim 1 wherein the foaming mixture also includes a tertiary amine catalyst.

4. A foam as defined in claim 1 wherein the polyether-polyol of (1) is prepared by condensation of a polyol first with propylene oxide and then with ethylene oxide.

5. A foam as defined in claim 4 wherein the polyether-polyol has an equivalent molecular weight of about 1600.

6. A foam as defined in claim 1 wherein the polyether-polyol of (2) is prepared by condensing 50 to 80% by weight of ethylene oxide with 50 to 20% by weight of an oxide selected from the group consisting of propylene oxide, butylene oxide, tetrahydrofuran and mixtures thereof.

7. A foam as defined in claim 6 wherein the oxide is propylene oxide.

8. A foam as defined in claim 1 wherein the polyether-polyol of (2) has an equivalent molecular weight within the range of 150 to 750.

9. A foam as defined in claim 1 wherein the polyisocyanate of (3) is selected from the group consisting of diphenyl methane di-isocyanate, polymethylene polyphenyl isocyanate and mixtures thereof.

10. A foam as defined in claim 1 wherein the tolylene di-isocyanate is a mixture of the 2,4- and the 2,6- isomers.

11. A foam as defined in claim 10 wherein the mixture contains from 80 to 65% by weight of the 2,4-isomer and 20 to 35% by weight of the 2,6-isomer.

12. A foam as defined in claim 1 wherein the components of the foaming mixture are mixed at a temperature not substantially greater than 25°C. and the resulting foaming mixture is cast in a mold having a temperature between ambient temperature and 40°C.

13. A foam as defined in claim 1 wherein the foaming mixture also contains 2–10% by weight of triethanolamine based upon the total quantity of the polyether-polyols, with the quantity of the organic polyisocyanates being adjusted such that the ratio of the total number of the NCO groups of the polyisocyanates to the total number of hydroxyl functions of the polyether-polyols and the triethanolamine is within the range of 0.6–1.5.

14. A foam as defined in claim 13 in which the quantity of triethanolamine is within the range of 3–5% by weight based upon the weight of the polyether-polyols.

15. Flexible polyurethane foams having a density less than 50 g/l prepared by casting in a mold in which the foam is cross-linked at ambient temperature without a thermal curing step a foaming mixture comprising: (1) at least one polyether-polyol having an equivalent molecular weight within the range of 1,000 to 2,000 and an average functionality within the range of 2.5 to 6, prepared by condensing an alkane triol first with an alkylene oxide containing at least 3 carbon atoms and then with ethylene oxide, with the ethylene oxide constituting from 10 to 30% by weight of the oxides condensed with the alkane triol; (2) 2 to 30% by weight, based on the weight of (1), of a polyether-polyol having an equivalent molecular weight within the range of 75 to 1,000 and an average functionality from 2 to 3, prepared by condensation of ethylene oxide or a mixture of ethylene oxide with at least one other alkylene oxide in which at least 25 % by weight of the mixture is ethylene oxide with a material selected from the group consisting of water, a glycol and a triol; (3) at least one organic polyisocyanate containing 2 to 4 benzene nuclei with each nucleus containing at least one isocyanate grouping; (4) 10 to 80% by weight, based on the weight of (3), of a tolylene di-isocyanate, and (5) a blowing agent; and removing the molded foam, with the ratio of the total NCO groups of (3) and (4) to the total of the hydroxyl groups of (1) and (2) being within the range of 0.6 to 1.5.

* * * * *